(12) United States Patent
Takemoto

(10) Patent No.: US 9,242,511 B2
(45) Date of Patent: Jan. 26, 2016

(54) PNEUMATIC TIRE WITH TREAD HAVING PITCH PM > PITCH PC > PITCH PS

(75) Inventor: Yoshiaki Takemoto, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 1094 days.

(21) Appl. No.: 13/305,621

(22) Filed: Nov. 28, 2011

(65) Prior Publication Data

US 2012/0145294 A1 Jun. 14, 2012

(30) Foreign Application Priority Data

Dec. 9, 2010 (JP) ................................. 2010-274919

(51) Int. Cl.
*B60C 11/03* (2006.01)

(52) U.S. Cl.
CPC ......... *B60C 11/0306* (2013.04); *B60C 11/0318* (2013.04); *B60C 2011/0348* (2013.04); *B60C 2011/0374* (2013.04); *B60C 2011/0383* (2013.04); *B60C 2011/0393* (2013.04)

(58) Field of Classification Search
CPC .................. B60C 11/0306; B60C 2011/0393; B60C 2011/0348; B60C 2011/0374; B60C 11/0302; B60C 11/0318; B60C 2011/0383
See application file for complete search history.

(56) References Cited

U.S. PATENT DOCUMENTS

| | | | | |
|---|---|---|---|---|
| 5,964,266 A | * | 10/1999 | Boiocchi et al. | 152/209.2 |
| 2002/0139460 A1 | * | 10/2002 | Boiocchi et al. | 152/209.2 |
| 2005/0257870 A1 | * | 11/2005 | Ohsawa et al. | 152/209.9 |
| 2006/0137791 A1 | * | 6/2006 | Miyabe et al. | 152/209.18 |
| 2008/0093010 A1 | * | 4/2008 | Stuckey et al. | 156/110.1 |
| 2012/0168050 A1 | * | 7/2012 | Terashima | 152/209.25 |

FOREIGN PATENT DOCUMENTS

| | | | | |
|---|---|---|---|---|
| JP | 58-078801 A | * | 5/1983 | |
| JP | 04-078701 A | * | 3/1992 | |
| JP | 04-317805 A | * | 11/1992 | |
| JP | 05-000608 A | * | 1/1993 | |
| JP | 07-276919 A | * | 10/1995 | |
| JP | 2004-17863 A | | 1/2004 | |
| JP | 2004-351970 A | * | 12/2004 | |
| JP | 2014-227007 A | * | 12/2014 | |

OTHER PUBLICATIONS

Machine translation for Japan 2014-227007 (no date).*
Machine translation for Japan 2004-351970 (no date).*
Machine translation for Japan 07-276919 (no date).*
Machine translation for Japan 05-000608 (no date).*
Translation for Japan 58-078801 (no date).*

* cited by examiner

*Primary Examiner* — Steven D Maki
(74) *Attorney, Agent, or Firm* — Birch, Stewart, Kolasch & Birch, LLP

(57) ABSTRACT

A pneumatic tire with a tread has crown main grooves, shoulder main grooves, a pair of middle ribs between the crown main grooves and the shoulder main grooves, and a pair of shoulder ribs between the shoulder main groove and tread edge. The shoulder rib has shoulder lateral grooves spaced at a pitch Ps. The middle rib has middle inclined grooves spaced at a pitch Pm. The crown rib has a plurality of crown lateral grooves which cross over the crown rib and are spaced at a pitch Pc. The pitch Pc is larger than the pitch Ps and smaller than the pitch Pm.

7 Claims, 6 Drawing Sheets

PNEUMATIC TIRE WITH TREAD HAVING PITCH PM > PITCH PC > PITCH PS

BACKGROUND OF THE INVENTION

1. Field of the Invention

The present invention relates to pneumatic tires improved in wet grip performance without deteriorating steering stability.

2. Description of the Background Art

For example, as shown in FIG. 6, there is suggested a tire having crown main grooves b1 arranged on both sides of a tire equator Co and shoulder main grooves b2 arranged axially outward from the crown main grooves b1, whereby a tread section a is divided into a crown rib c1, middle ribs c2 and c2, and shoulder ribs c3 and c3, and the ribs c1, c2 and c3 are provided with lateral grooves d1, d2, and d3 (refer to Japanese Patent Application Publication No. 2004-17863, for example).

This tire includes the lateral grooves d2 which are arranged on the middle ribs c2, inclined at an angle θ of 10 to 45 degrees with respect to the tire circumferential direction, and are formed as steeply inclined grooves e with the angle θ decreased gradually axially inward. Such a tire cuts off water films on roads and delivers excellent drainage performance approximate to that of a tire with circumferential grooves, thereby achieving excellent wet grip performance. In addition, the inclined grooves e have axial inner ends discontinued near the crown main grooves b1 without intersecting the same, which suppresses reduction in pattern rigidity to thereby provide steering stability on dry roads.

In recent years, however, with upgrading of road networks and increase in speed and performance of vehicles, there has been a growing demand for tires further improved in steering stability and web grip performance.

In view of such circumstances, the inventor has conducted various researches and discovered that it is possible to further improve tires in rigidity balance at a tread section and achieve high-level compatibility between steering stability and wet grip performance, by setting a tire circumferential pitch P1 of the lateral grooves d1 arranged on the crown rib c1 as smaller than a tire circumferential pitch P2 of the lateral grooves d2 (inclined grooves e) arranged on the middle ribs c2 and larger than a tire circumferential pitch P3 of the lateral grooves d3 arranged on the shoulder ribs c3, and by defining the tire circumferential pitch P2 of the lateral grooves d2 and a circumferential length of the lateral grooves d2.

SUMMARY OF THE INVENTION

An object of the present invention is to provide a pneumatic tire that improves a rigidity balance in a tread pattern and achieves high-level compatibility between steering stability and wet grip performance, by defining tire circumferential pitches and circumferential lengths of lateral grooves.

According to the present invention, a pneumatic tire comprises, on a tread portion of the tire: a pair of crown main grooves each extending circumferentially on both sides of a tire equator, a pair of shoulder main grooves each extending circumferentially on axial outside of the crown main grooves, a crown rib between the crown main grooves, a pair of middle ribs each between the crown main groove and the shoulder main groove, and a pair of shoulder ribs each between the shoulder main groove and a tread edge, wherein the shoulder rib is provided with a plurality of shoulder lateral grooves spaced at a tire circumferential pitch Ps, the shoulder lateral groove extends at an angle alpha of from 65 to 115 degrees with respect to a tire circumferential direction, from axial outside of the tread edge to axial inside, the middle rib is provided with a plurality of middle inclined grooves spaced at a tire circumferential pitch Pm, the middle inclined groove extends at an angle beta of from 0 to 75 degrees with respect to the tire circumferential direction, axially inward from the shoulder main groove, and has an axial inner end terminated within the middle rib, the crown rib is provided with a plurality of crown lateral grooves which cross over the crown rib and are spaced at a tire circumferential pitch Pc, a circumferential length Lm of the middle inclined groove is 70 to 125 of the tire circumferential pitch Pm of the middle inclined grooves, the tire circumferential pitch Pm of the middle inclined grooves is set in a range of from 2.5 to 4.0 times the tire circumferential pitch Ps of the shoulder lateral grooves, and the tire circumferential pitch Pc of the crown lateral grooves is larger than the tire circumferential pitch Ps of the shoulder lateral grooves and smaller than the tire circumferential pitch Pm of the middle inclined grooves.

Here, the tread edges are the axial outermost edges of the ground contacting patch in a condition that the tire is mounted on a standard wheel rim and inflate to a standard pressure and loaded with a standard load.

The standard wheel rim is a wheel rim officially approved for the tire by standard organization, i.e. JATMA (Japan and Asia), T&RA (North America), ETRTO (Europe), STRO (Scandinavia) and the like. The standard rim is the "standard rim" specified in JATMA, the "Measuring Rim" in ETRTO, the "Design Rim" in TRA or the like.

The standard pressure is an air pressure for tire specified by the standard organization above. For example, the standard pressure is the "maximum air pressure" in JATMA, the "Inflation Pressure" in ETRTO, the maximum pressure given in the "Tire Load Limits at Various Cold Inflation Pressures" table in TRA or the like.

The standard load is a tire load specified by the standard organization above. For example, the standard load is the "maximum load capacity" in JATMA, the "Load Capacity" in ETRTO, the maximum value given in the above-mentioned table in TRA or the like.

DESCRIPTION OF THE PREFERRED EMBODIMENTS

An embodiment of the present invention will be described below in detail on the basis of the drawings.

Figure 1:
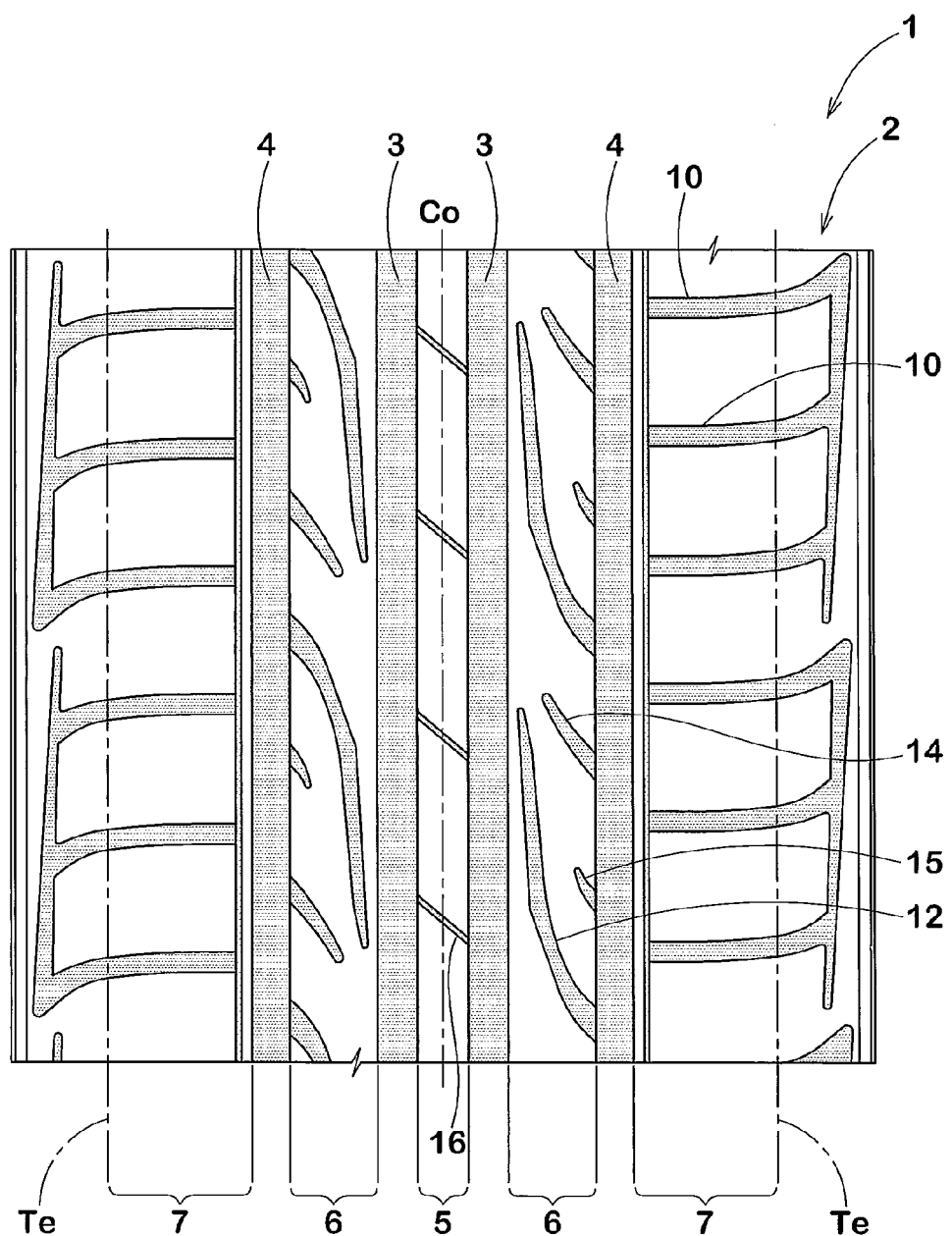
FIG. 1 is a plane development view of one embodiment of a tread pattern on a pneumatic tire of the present invention.
Figure 2:
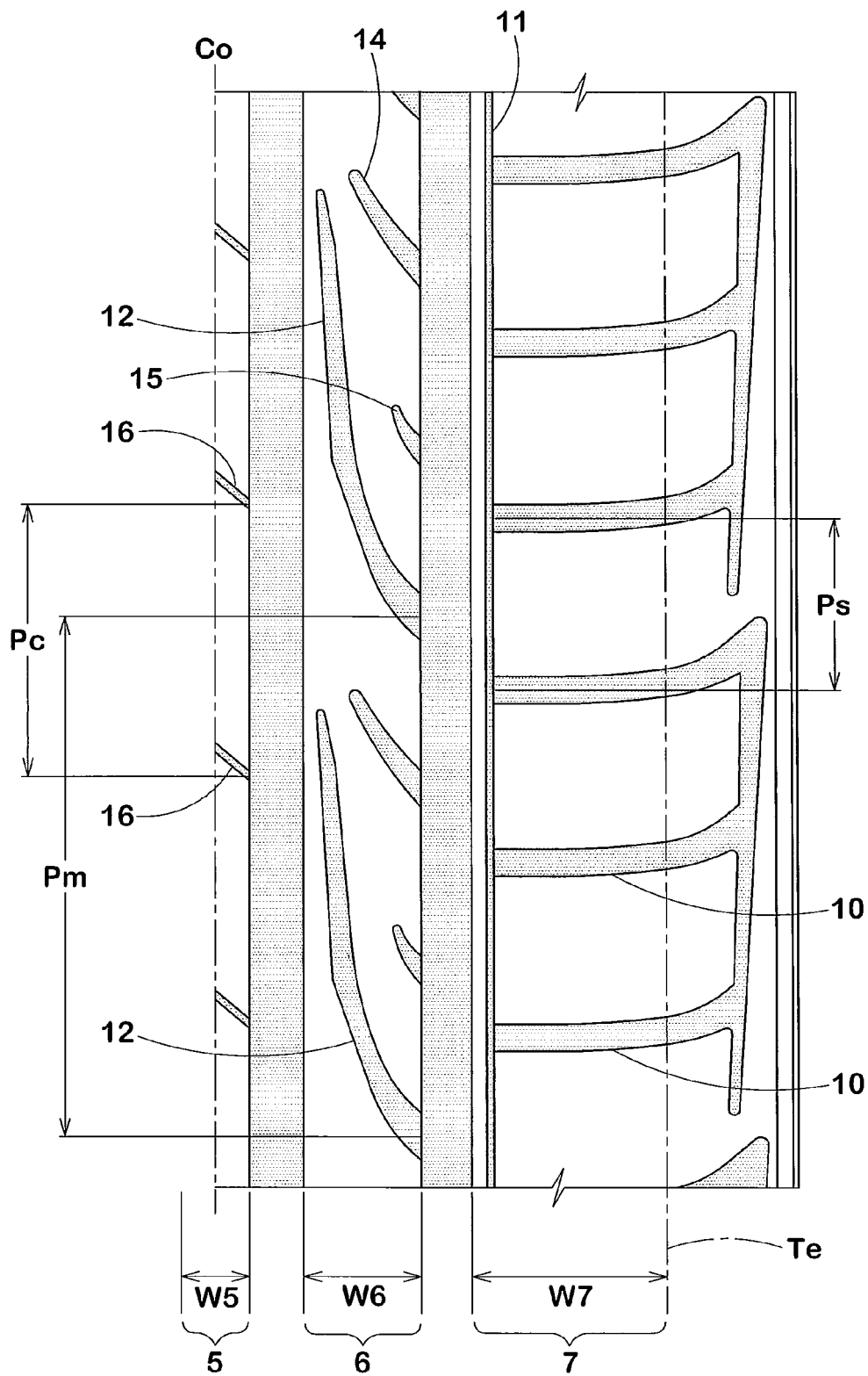
FIG. 2 is an enlarged development view of a part of the tread pattern.

In FIG. 1, a pneumatic tire 1 of this embodiment is configured to provide a tread portion 2 with a pair of crown main grooves 3 extending circumferentially on both sides of a tire equator Co and a pair of shoulder main grooves 4 extending circumferentially on axial outside of the crown main grooves. With this, the tread portion 2 is divided into a crown rib 5 between the crown main grooves 3, a pair of middle ribs 6 between the crown main groove 3 and the shoulder main groove 4, and a pair of shoulder ribs 7 between the shoulder main groove 4 and tread edge Te. Assuming that axial widths of the crown rib 5, middle ribs 6, and shoulder ribs 7 are designated as W5, W6, and W7, respectively, the relationship W5≤W6≤W7 holds in this embodiment.

The crown main grooves 3 and the shoulder main grooves 4 are straight grooves extending circumferentially in a straight line, and are arranged in linear symmetry with respect to the tire equator Co. widths and depths of the crown main grooves 3 and the shoulder main grooves 4 may be preferably identical to widths and depths of common circumferential main grooves. In the case of tires for passenger car, for example, the groove width is preferably not less than 3 mm, in particular not less than 5 mm, and not more than 14 mm, in particular not more than 12 mm. In addition, the groove depth is preferably not less than 5 mm, in particular not less than 6 mm, and not more than 12 mm, in particular not more than 10 mm. In this embodiment, the crown main grooves 3 have a groove width W3 of 10.5 mm and a groove depth H3 of 8.2 mm, and the shoulder main grooves 4 have a groove width W4 of 8.2 mm and a groove depth H4 of 8.2 mm.

Figure 3:
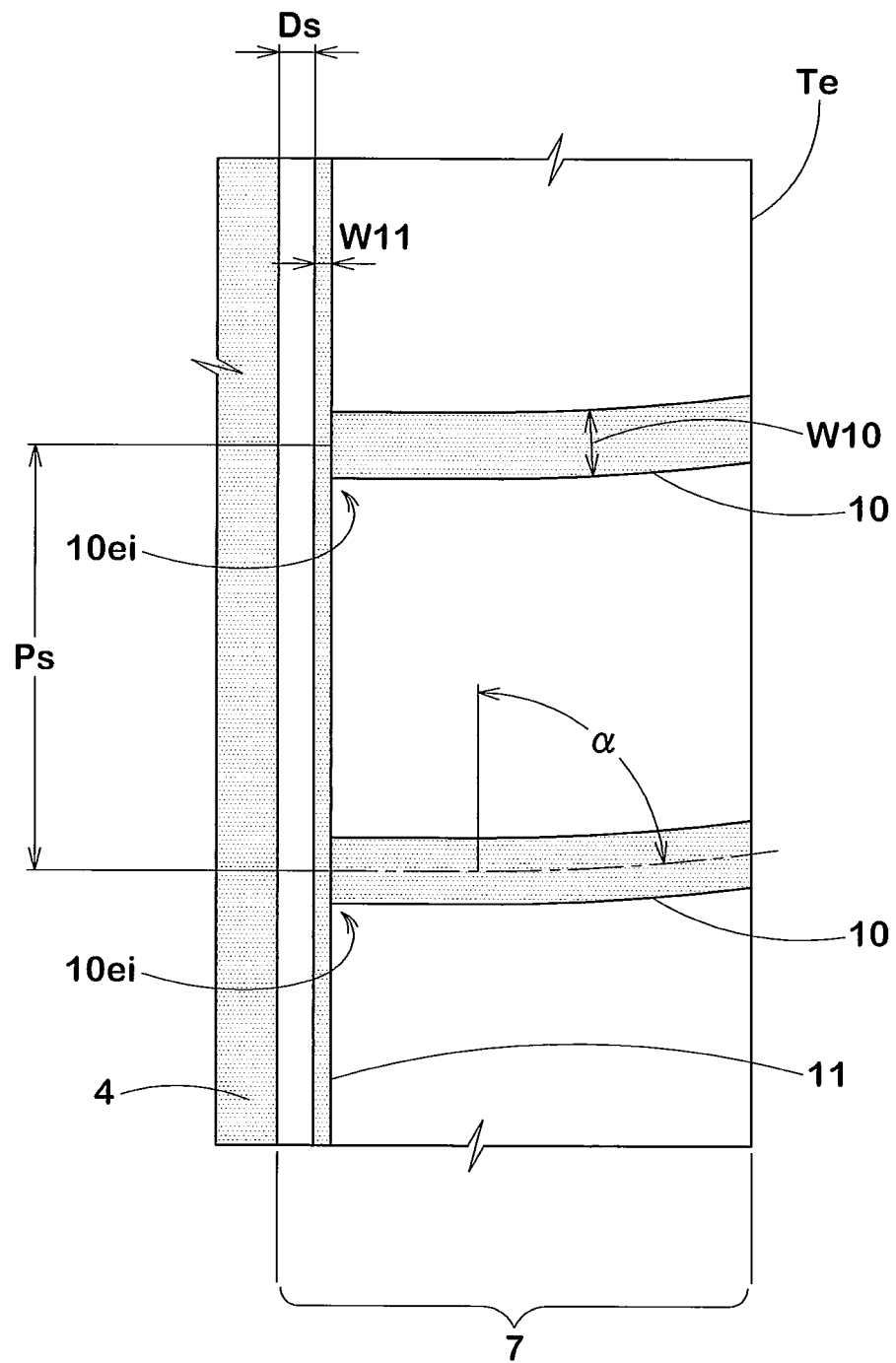
FIG. 3 is an enlarged development view of a shoulder rib.

Each shoulder rib 7 is provided with a plurality of shoulder lateral grooves 10 at a tire circumferential pitch Ps, as shown in FIG. 3. The shoulder lateral grooves 10 extend at an angle α of from 65 to 115 degrees with respect to a tire circumferential direction, from axial outside of the tread edges Te to axial inside. Such a shoulder lateral grooves 10 are formed at an angle approximate to that of a flowing water line. This realizes effective water drainage toward outside of the tread edges Te and provides sufficient lateral rigidity of the shoulder ribs 7, thereby improving uneven wear resistance. If the angle α deviates from the range of from 65 to 115 degrees, the foregoing advantages cannot be achieved.

In this embodiment, the shoulder lateral grooves 10 have axial inner ends 10ei discontinued within the shoulder ribs 7. In addition, the shoulder ribs 7 are provided with shoulder narrow grooves 11 extending in circumferential direction through the axial inner ends 10ei of the shoulder lateral grooves 10. Therefore, high circumferential rigidity of the shoulder ribs 7 is maintained, which contributes to improvement in steering stability.

The groove width W11 of the shoulder narrow grooves 11 is smaller than the groove width W4 of the shoulder main grooves 4. In this embodiment, the groove width W11 is set not more than 3 mm, preferably not more than 2 mm. The groove depth H11 of the shoulder narrow grooves 11 is smaller than the groove depth H4 of the shoulder main grooves 4. In this embodiment, the groove depth H11 is set not more than 3 mm, preferably not more than 2 mm.

The shoulder lateral groove 10 has a groove width W10 set smaller than the groove width W4 and larger than the groove width W11. In addition, the shoulder lateral groove 10 has a groove depth (depth of a deepest portion) H10 set at the groove depth H4 or less and larger than the groove depth H11.

Distance Ds between the shoulder main groove 4 and the shoulder narrow groove 11 is preferably set in a range of from 2.5 to 10.0 mm. The distance Ds of less than 2.5 mm decreases rigidity and deteriorates uneven wear resistance and steering stability, whereas the distance Ds exceeding 10.0 mm might deteriorate drainage performance.

Next, each middle rib 6 is provided with a plurality of middle inclined grooves 12 spaced at a tire circumferential pitch Pm.

Figure 4:
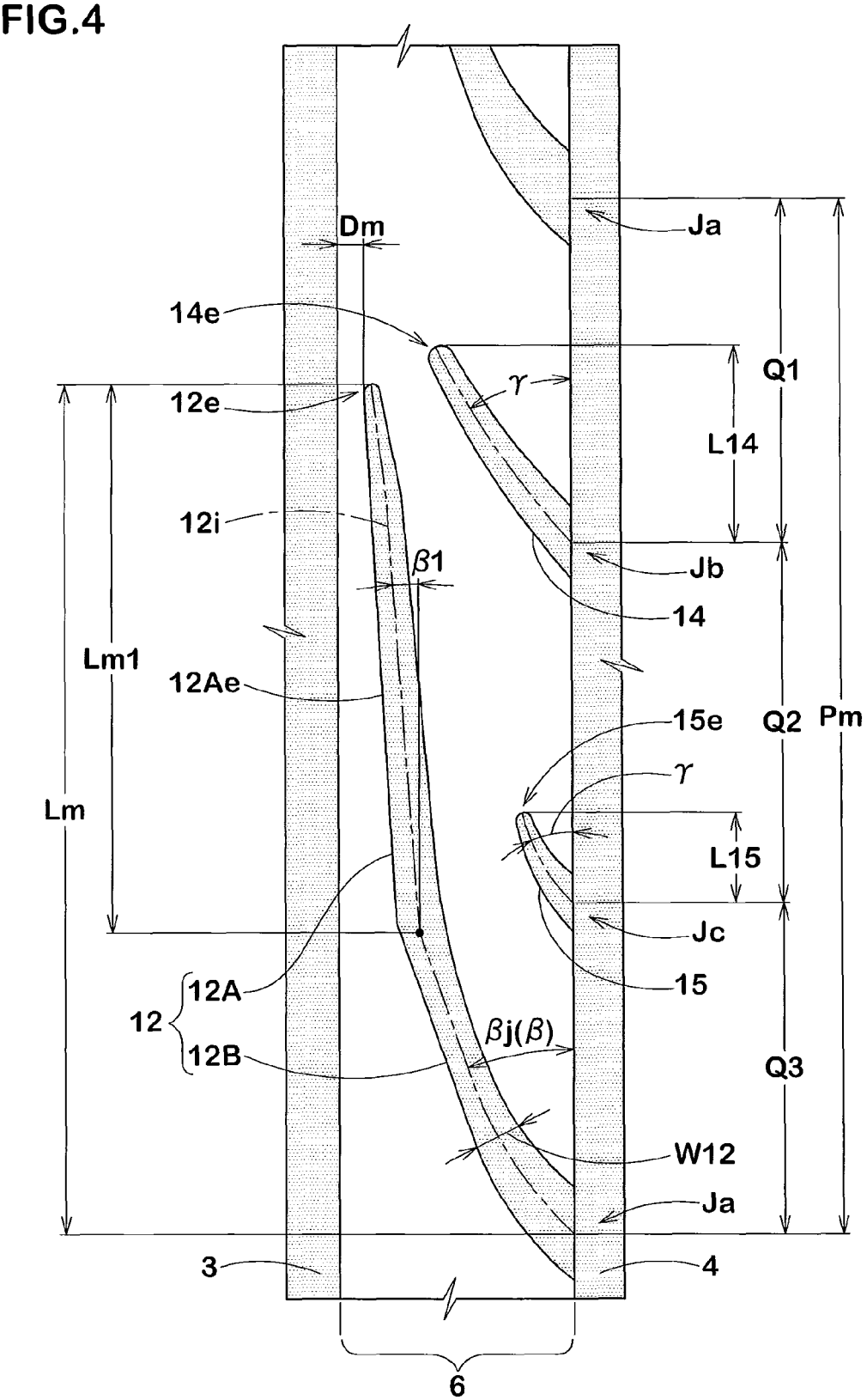
FIG. 4 is an enlarged development view of a middle rib.

The middle inclined grooves 12 extend with a steep inclination at a small angle β of 0 to 75 degrees with respect to the tire circumferential direction, axially inward from the shoulder main grooves 4, as shown in FIG. 4. The middle inclined groove 12 has an axial inner end 12e discontinued within the middle ribs 6. Axial distance Dm between the axial inner end 12e and the crown main groove 3 is preferably set in a range of from 1.5 to 5.0 mm, which is set smaller than the distance Ds in this embodiment. Circumferential length Lm of the middle inclined groove 12 is set at 70 to 125% of the tire circumferential pitch Pm of the middle inclined grooves 12.

The middle inclined groove 12 includes on axial inside thereof straight groove portion 12A extending in a straight line at an angle β1 of 15 degrees or less with respect to the tire circumferential direction. The description "extending in a straight line" includes not only an arrangement in which the middle inclined groove 12 has a groove width center lines 121 forming a straight line, but also an arrangement in which the middle inclined groove 12 has one bending portion with two straight lines bent at an angle of 170 to 180 degrees.

Specifically, the middle inclined groove 12 of this embodiment is formed by the straight groove portion 12A extending from the inner end 12e, and extending groove portion 12B warping in an arc and/or bending in a broken line such that the angle β increases axially outward, from the straight groove portion 12A to the shoulder main grooves 4. For example, the straight groove portion 12A has an axial inner groove edge 12Ae forming a straight line. In addition, it is desirable that the straight groove portion 12A has a circumferential length Lm1 preferably set at not less than 50% of the circumferential length Lm of the middle inclined groove 12.

As in the foregoing, the middle inclined groove 12 is steeply inclined with the circumferential length Lm, thereby to reduce drainage resistance and enhance drainage performance. In addition, the middle inclined groove 12 has the axial inner end 12e discontinued at the distance Dm from the crown main groove 3, whereby it is possible to provide high circumferential rigidity of the middle ribs 6 and improve uneven wear resistance and steering stability while maintaining drainage performance. In particular, forming the straight groove portion 12A in the middle inclined groove 12 further enhances drainage performance. Moreover, the straight groove portion 12A decreases smoothly the distance from the crown main groove 3, which suppresses formation of a great rigidity transition point that may cause uneven wear.

In addition, the straight groove portion 12A has the inner groove edge 12Ae formed in a straight line. This further suppresses formation of a rigidity transition point, which is advantageous for uneven wear resistance. If the angle β exceeds 75 degrees, it is difficult to provide sufficient drainage performance. If the angle β1 of the straight groove portions 12A exceeds 15 degrees and the circumferential length Lm1 becomes smaller than 50% of the circumferential length Lm of the middle inclined groove 12, it is not possible to achieve sufficiently the effects of the straight groove portions 12A of enhancing drainage performance and improving uneven wear resistance while suppressing occurrence of a starting point of uneven wear. If the distance Dm is smaller than 1.5 mm, the rigidity of the middle rib 6 decreases, which leads to deterioration of uneven wear resistance and steering stability. In contrast, if the distance Dm exceeds 5.0 mm, drainage performance becomes insufficient.

The extending groove portion 12B is formed in such a manner that, out of the angle β, an angle βj is 30 to 75 degrees at intersecting portions Ja with respect to the shoulder main groove 4. This suppresses deterioration in drainage performance and lateral rigidity of the intersecting portions Ja. If the angle βj deviates from the foregoing range, the intersecting portions Ja decrease in drainage performance, thereby bringing about deterioration of lateral rigidity.

The middle inclined groove 12 has a groove width W12 smaller than the groove width W4. In addition, the middle inclined groove 12 has a groove depth (depth of a deepest portion) H12 smaller than the groove depth H4. In this embodiment, the groove depth H12 gradually decreases from the intersecting portions Ja to the axial inner end 12e.

The middle rib 6 has first and second middle sub grooves 14 and 15 extending axially inward from the shoulder main groove 4 passing between circumferentially adjacent middle inclined grooves 12 and 12. The first and second middle sub grooves 14 and 15 are inclined at an angle γ of not more than 75 degrees with respect to tire circumferential direction as with the middle inclined groove 12, and have axial inner ends 14e and 15e both discontinued within the middle rib 6. The first and second middle sub grooves 14 and 15 have circumferential lengths L14 and L15 equal to or less than 30% of the circumferential length Lm of the middle inclined groove 12. In this embodiment, the first and second middle sub grooves 14 and 15 warp in an arc such that the angle γ decreases axially inward. If the lengths L14 and L15 exceed 30% of the circumferential length Lm, the middle ribs 6 excessively decrease in rigidity, which have adverse effect on steering stability.

Assuming that the intersecting portion of the shoulder main groove 4 and the middle inclined groove 12 is designated as Ja, intersecting portion of the shoulder main groove 4 and the first middle sub groove 14 is designated as J3, and intersecting portion of the shoulder main groove 4 and the second middle sub groove 15 is designated as Jc, a circumferential distance Q1 between the circumferentially adjacent intersecting portions Ja and Jb, a circumferential distance Q2 between the intersecting portions Jb and Jc, and a circumferential distance Q3 between the intersecting portions Jc and Ja, all is preferably set in a range of from 30 to 35% of the circumferential pitch Pm of the middle rib 6. Therefore, the first and second middle sub grooves 14 and 15 are spaced at circumferential intervals almost equal to each other between the middle inclined grooves 12 and 12.

Figure 5:
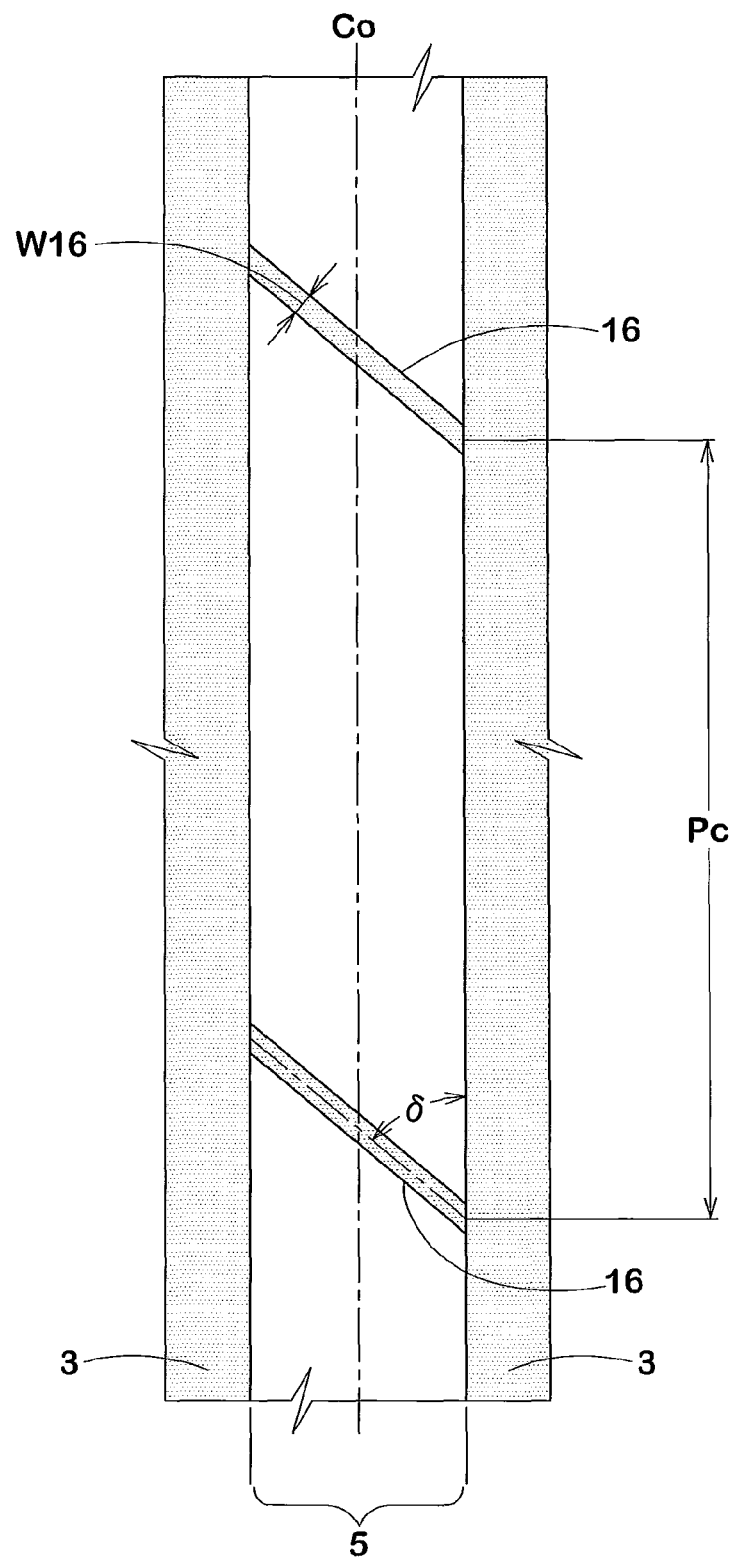
FIG. 5 is an enlarged development view of a crown rib.

Next, the crown rib 5 has a plurality of crown lateral grooves 16 spaced at a tire circumferential pitch Pc so as to cross over the crown rib 5, as shown in FIG. 5. Specifically, both axial ends of the crown lateral groove 16 are opened at the crown main grooves 3. The crown lateral groove 16 is a narrow groove with a groove width W16 of from 0.3 to 2.0 mm, and extends at an angle δ with respect to the tire circumferential direction. Such a crown lateral groove 16 relieve appropriately lateral rigidity of the crown rib 5 to allow the tire to easily follow changes in slip angle during running of the vehicle, which brings about enhancement in responsiveness of the tire and improvement in steering stability.

Figure 6:
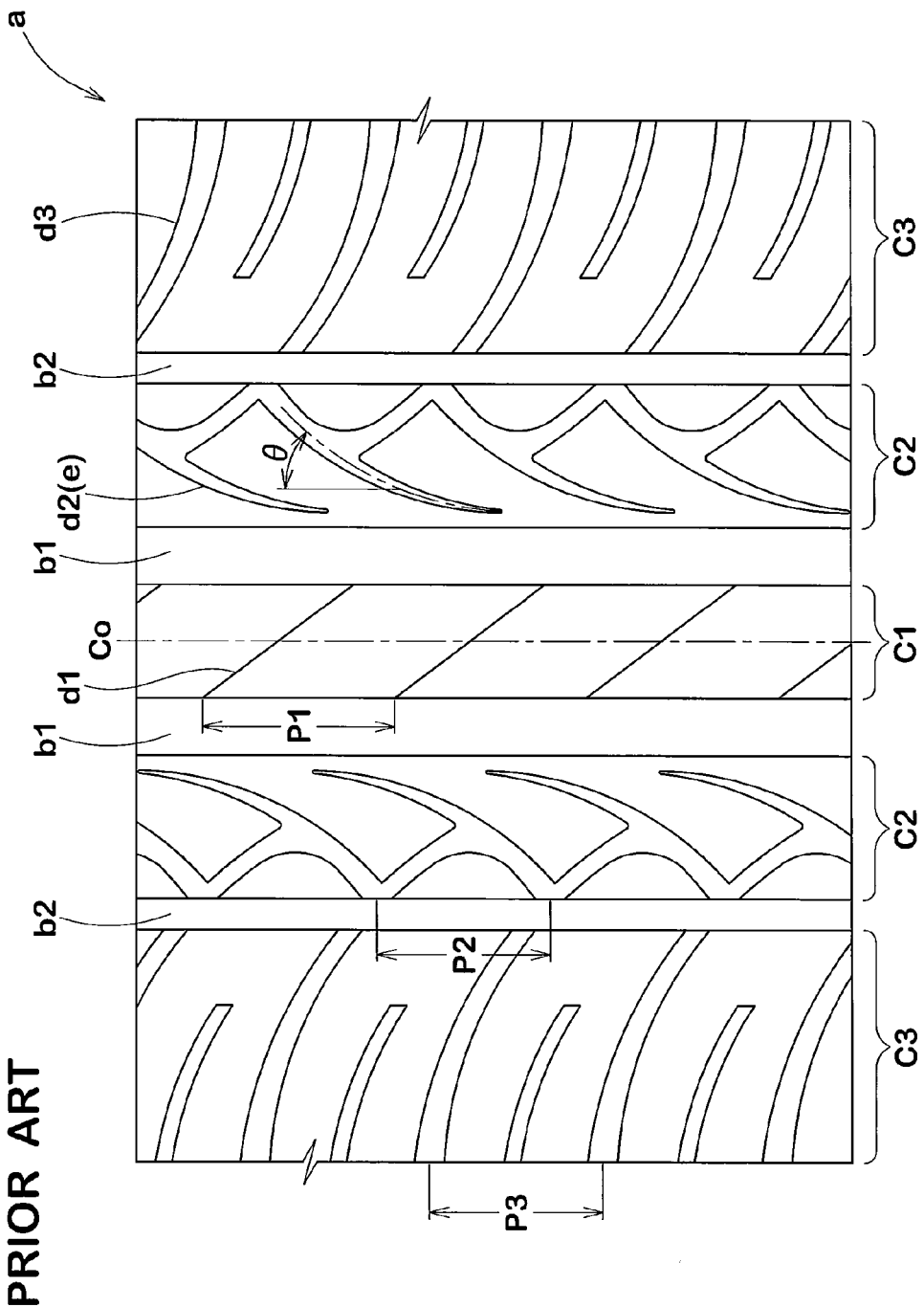
FIG. 6 is a development view of one example of a tread pattern on a conventional tire.

In the present invention, the pitch Pc of the crown lateral grooves 16 is set larger than the pitch Ps of the shoulder lateral grooves 10 and smaller than the pitch Pm of the middle inclined grooves 12. In, addition, the pitch Pm is set within a range of 2.5 to 4.0 times the pitch Ps. In a conventional tire, the pitch P2 of the lateral grooves d2 arranged on the middle ribs c2 is set as small as 2.0 times or less, in general 1.0 time the circumferential pitch P3 of the lateral grooves d3 arranged on the shoulder ribs c3, as shown in FIG. 6.

Here, if the pitch Pc, Pm, or Ps vary by a variable pitch method or the like, the pitch Pc can be an average circumferential pitch PcN obtained by dividing a length Lc of a distance of the crown rib 5 around the tire by a pitch count (number of pitches) Nc of the crown lateral grooves 16 (=Lc/Nc). similarly, the pitch Pm can be an average circumferential pitch PmN obtained by dividing a length Lm of a distance of the middle rib 6 around the tire by a pitch count (number of pitches) Nm of the middle inclined grooves 12 (=Lm/Nm). Similarly, the pitch Ps can be an average circumferential pitch PsN obtained by dividing a length Ls of a distance of the shoulder rib 7 around the tire by a pitch count (number of pitches) Ns of the shoulder lateral grooves 10 (=Ls/Ns).

As in the foregoing, the circumferential length Lm of the middle inclined grooves 12 is set at 70 to 125% of the pitch Pm of the middle inclined grooves 12, and the pitch Pm is set within a range of 2.5 to 4.0 times the pitch Ps of the shoulder lateral grooves 10. Therefore, the circumferential length Lm of the middle inclined grooves 12 is set longer than that of a conventional tire, thereby further improving drainage performance. In this embodiment, particularly, the middle inclined groove 12 has the straight groove portion 12A to further enhance drainage performance.

Meanwhile, since the circumferential length Lm of the middle inclined grooves 12 is made longer and the straight groove portion 12A is formed as described above, there is a fear that the middle rib 6 might decrease rigidity in tire equator side regions to thereby deteriorate steering stability. However, as described above, the tire 1 of this embodiment has the circumferential pitch Pm set larger than a conventional one, specifically at 2.5 to 4.0 times the circumferential pitch Ps, which suppresses the reduction of rigidity and achieves higher-level compatibility between drainage performance and steering stability.

In addition, the pitch Pc of the crown lateral grooves 16 is set larger than the pitch Ps of the shoulder lateral grooves 10. Therefore, lengthening the circumferential pitch Ps further compensates for deterioration in steering stability due to reduction in rigidity of the middle ribs 6 in a tire equatorial region. This provides an appropriate rigidity balance among the crown rib 5, the middle ribs 6, and the shoulder ribs 7, thereby achieving improvement of steering stability.

If the circumferential length Lm of the middle inclined grooves 12 is less than 70% of the circumferential pitch Pm of the middle inclined grooves 12, drainage performance becomes insufficient. In contrast, if the same exceeds 125%, it is impossible to solve lack of rigidity of the middle ribs 6 in the tire equator side regions. In addition, if the circumferential pitch Pm of the middle inclined grooves 12 is less than 2.5 times the circumferential pitch Ps of the shoulder lateral grooves 10, it is impossible to provide sufficiently the circumferential length Lm of the middle inclined grooves 12, thereby resulting in insufficient drainage performance, or it is impossible to solve lack of rigidity of the middle ribs 6 in the tire equator side regions. In contrast, if the circumferential pitch Pm exceeds 4.0 times the circumferential pitch Ps, the middle ribs 6 lack drainage performance in ground-contact edge side regions.

Although a preferred embodiment of the present invention is as described above, the present invention is not limited to the embodiment shown in the drawings, and can be modified and carried out in various manners.

Comparative Test:

Prototype radial tires for passenger car with a tire size of 195/65R15 were produced based on the tread pattern shown in FIG. 1 in accordance with specifications in Table 1. Then, the prototyped tires were tested for wet performance, steering stability on dry road surfaces, and uneven wear resistance. In addition, a tire of the same size having the pattern shown in FIG. 6 (conventional example) was also tested for comparison. All the tires are virtually identical in specifications except for the specifications in Table 1.

Common Specifications:

| Crown main groove | |
|---|---|
| Groove width W3 | 10.5 mm |
| Groove depth H3 | 8.2 mm |
| Shoulder main groove | |
| Groove width W4 | 8.2 mm |
| Groove depth H4 | 8.2 mm |
| Shoulder lateral groove | |
| Groove width W10 | 4.2 mm |
| Groove depth (maximum value) H10 | 6.2 mm |
| Middle inclined groove | |
| Groove width W12 | 7.0 mm |
| Groove depth (maximum value) H12 | 6.7 mm |
| Crown lateral groove | |
| Groove width W13 | 8.0 mm |
| Groove depth (maximum value) H13 | 4.0 mm |

In addition, "n" middle inclined grooves were provided at positions corresponding to (n+1) with the circumferential pitch Pm of the middle inclined grooves.

Wet Performance:

In the wet performance, a 2000 cc engine passenger car provided with an assembly of a wheel (6J) and a test tire inflated to 180 kPa as all the four wheels was run along a 100 meter radius circle on an asphalt road partially provided with a 5 mm-depth, 20 m-long water pool, and the lateral acceleration (lateral G) during running in the water pool was measured at the front wheels, gradually increasing the speed entering into the water pool, to obtain the average lateral acceleration for the speed range of from 50 to 80 km/h. The results are indicated in table 1 by an index based on the conventional example being 100, wherein the larger is better.

Steering Stability Performance:

The test car mentioned-above was run on a dry asphalt test road, and the test driver evaluated steering stability based on cornering response, rigidity and grip. The test results are indicated in Table 1 by an index based on the conventional example being 100. The larger the index, the better the performance.

Uneven Wear Resistance Performance:

The foregoing vehicle was run total 8,000 km in highways and urban areas. After that, the tread surface was visually checked for wear conditions. Check results are shown in table 1 by an index based on the conventional example being 100. The larger the index, the better the performance.

TABLE 1

| | Conventional Example | Example 1 | Example 2 | Example 3 | Example 4 | Example 5 | Comparative example 1 | Comparative example 2 | Comparative example 3 | Comparative example 4 |
|---|---|---|---|---|---|---|---|---|---|---|
| <Shoulder lateral groove> | Applicable | Applicable | ← | ← | ← | ← | ← | ← | ← | ← |
| Angle α <°> (*1) | (85, 90) | (85, 90) | ← | ← | ← | ← | ← | ← | ← | ← |
| Distance Ds <mm> | 0 | 4 | ← | ← | ← | ← | ← | ← | ← | ← |
| <Middle inclined groove> | Applicable | Applicable | ← | ← | ← | ← | ← | ← | ← | ← |
| Angle β <°> (*1) | (55, 5) | (55, 5) | ← | ← | ← | ← | ← | ← | ← | ← |
| Circumferential length Lm <mm> | 40 | 57 | 72 | 102 | 48 | 95 | 41 | 126 | 36 | 106 |
| Distance Dm <mm> | 5 | 2 | ← | ← | ← | ← | ← | ← | ← | ← |
| Straight groove portion | Not applicable | Applicable | ← | ← | ← | ← | ← | ← | ← | ← |
| Angle β1 <°> | — | 5 | ← | ← | ← | ← | ← | ← | ← | ← |
| Circumferential length Lm1/Lm | — | 1 | ← | ← | ← | ← | ← | ← | ← | ← |
| Middle sub groove | — | Applicable | ← | ← | ← | ← | ← | ← | ← | ← |
| Number of grooves <grooves> (*2) | — | 2 | ← | ← | ← | ← | ← | ← | ← | ← |
| Angle γ <°> (*1) | — | (30, 50) | ← | ← | ← | ← | ← | ← | ← | ← |
| Circumferential length (*3) | — | 26%, 11% | ← | ← | ← | ← | ← | ← | ← | ← |
| <Crown lateral groove> | Applicable | Applicable | ← | ← | ← | ← | ← | ← | ← | ← |
| Angle δ <°> | 45 | 45 | ← | ← | ← | ← | ← | ← | ← | ← |
| <Circumferential pitch> | | | | | | | | | | |
| Ps <mm> | 27.2 | ← | ← | ← | ← | ← | ← | ← | ← | ← |
| Pm <mm> | 27.2 | 81.5 | ← | ← | 54.4 | 108.8 | 81.5 | 81.5 | 41 | 120 |
| Pc <mm> | 27.2 | 40.8 | ← | ← | ← | ← | ← | ← | ← | ← |
| (Ratio Lm/Pm) | 1.46 | 0.70 | 0.88 | 1.25 | 0.88 | 0.88 | 0.50 | 1.53 | 0.88 | 0.88 |
| (Ratio Pm/Ps) | 1 | 3.0 | 3.0 | 3.0 | 2.0 | 4.0 | 3.0 | 3.0 | 1.5 | 4.4 |
| (Ratio Pc/Ps) | 1 | 1.5 | 1.5 | 1.5 | 1.5 | 1.5 | 1.5 | 1.5 | 1.5 | 1.5 |
| <Wet performance> | 100 | 115 | 120 | 125 | 110 | 125 | 95 | 130 | 95 | 105 |
| <Steering stability performance> | 100 | 125 | 120 | 110 | 105 | 105 | 115 | 95 | 95 | 110 |
| <Uneven wear resistance performance> | 100 | 105 | 105 | 100 | 105 | 100 | 105 | 95 | 100 | 95 |

| | Example 6 | Example 7 | Example 8 | Example 9 | Comparative example 5 | Example 10 | Example 11 | Example 12 | Comparative example 6 |
|---|---|---|---|---|---|---|---|---|---|
| <Shoulder lateral groove> | Applicable | ← | ← | ← | ← | ← | ← | ← | ← |
| Angle α <°> (*1) | (85, 90) | ← | ← | ← | ← | ← | ← | ← | ← |
| Distance Ds <mm> | 3.7 | ← | ← | ← | ← | ← | ← | 0 | 3.7 |
| <Middle inclined groove> | Applicable | ← | ← | ← | ← | ← | ← | ← | ← |
| Angle β <°> (*1) | (55, 5) | ← | ← | ← | ← | ← | ← | ← | ← |
| Circumferential length Lm <mm> | 72 | ← | ← | ← | ← | ← | ← | ← | ← |
| Distance Dm <mm> | 1.5 | 5.0 | 2.2 | ← | ← | ← | ← | ← | 0 |
| Straight groove portion | Applicable | ← | ← | Not applicable | Applicable | ← | ← | ← | ← |
| Angle β1 <°> | 5 | ← | ← | — | 5 | ← | ← | ← | ← |
| Circumferential length Lm1/Lm | 0.63 | ← | 0.5 | 0 | 0.63 | ← | ← | ← | ← |

TABLE 1-continued

| | | | | | | | | | |
|---|---|---|---|---|---|---|---|---|---|
| Middle sub groove | Applicable | ← | ← | ← | ← | ← | Not applicable | Applicable | ← |
| Number of grooves <grooves> (*2) | 2 | ← | ← | ← | ← | 1 | 0 | 2 | ← |
| Angle γ <°> (*1) | (30, 50) | ← | ← | ← | ← | ← | — | (30, 50) | ← |
| Circumferential length (*3) | 26%, 11% | ← | ← | ← | ← | 26% | — | 26%, 11% | ← |
| <Crown lateral groove> | Applicable | ← | ← | ← | Not applicable | Applicable | ← | ← | ← |
| Angle δ <°> | 45 | ← | ← | ← | — | 45 | ← | ← | ← |
| <Circumferential pitch> | | | | | | | | | |
| Ps <mm> | | ← | ← | ← | ← | ← | ← | ← | ← |
| Pm <mm> | | ← | ← | ← | ← | ← | ← | ← | ← |
| Pc <mm> | | ← | ← | ← | ← | ← | ← | ← | ← |
| (Ratio Lm/Pm) | | ← | ← | ← | ← | ← | ← | ← | ← |
| (Ratio Pm/Ps) | | ← | ← | ← | ← | ← | ← | ← | ← |
| (Ratio Pc/Ps) | 1.5 | 1.5 | 1.5 | 1.5 | 0 | 1.5 | 1.5 | 1.5 | 1.5 |
| <Wet performance> | 120 | 110 | 100 | 90 | 95 | 105 | 90 | 130 | 130 |
| <Steering stability performance> | 100 | 125 | 120 | 115 | 100 | 110 | 100 | 90 | 90 |
| <Uneven wear resistance performance> | 95 | 100 | 110 | 105 | 100 | 110 | 100 | 100 | 80 |

(*1) For the angles α, β, and δ, the angles at axial inner ends and axial outer ends are described in parentheses.
(*2) The number of middle sub grooves refers to the number of middle sub grooves arranged between middle inclined grooves.
(*2y) The number of middle sub grooves refers to the number of middle sub grooves arranged between middle inclined grooves.
(*3) The circumferential length is indicated by a ratio to the middle inclined groove Lm. If there is a plurality of middle sub grooves, the lengths are described in ascending order.

As shown in Table 1, it is understood that the tire of the embodiment of the present invention achieves high-level compatibility between steering stability and web grip performance while providing uneven wear resistance performance.

The invention claimed is:

1. A pneumatic tire comprising a tread portion, the tread portion provided with:
    a pair of circumferentially extending crown main grooves arranged on both sides of a tire equator;
    a pair of circumferentially extending shoulder main grooves arranged axially outside the crown main grooves;
    a crown rib between the crown main grooves;
    a pair of middle ribs each between the crown main groove and the shoulder main groove; and
    a pair of shoulder ribs each between the shoulder main groove and a tread edge, wherein
    each of the shoulder rib is provided with a plurality of shoulder lateral grooves spaced at a tire circumferential pitch Ps and a shoulder narrow groove,
    each of the shoulder lateral grooves extends axially inwardly from the axially outside of the tread edge at an angle α of from 65 to 115 degrees with respect to a tire circumferential direction,
    each shoulder lateral groove has an axial inner end terminated within the shoulder rib,
    the shoulder narrow groove extends circumferentially through the axial inner ends of the shoulder lateral grooves and has a groove width being smaller than a groove width of the shoulder main groove,
    each of the middle rib is provided with a plurality of middle inclined grooves spaced at a tire circumferential pitch Pm,
    each of the middle inclined grooves extends axially inwardly from the shoulder main groove at an angle β of from 0 to 75 degrees with respect to the tire circumferential direction and has an axial inner end terminated within the middle rib,
    the crown rib is provided with a plurality of crown lateral grooves which extend across the crown rib and are spaced at a tire circumferential pitch Pc,
    a circumferential length Lm of the middle inclined groove is in a range of from 70% to 125% of the tire circumferential pitch Pm of the middle inclined grooves,
    the tire circumferential pitch Pm of the middle inclined grooves is set in a range of from 2.5 to 4.0 times the tire circumferential pitch Ps of the shoulder lateral grooves, and
    the tire circumferential pitch Pc of the crown lateral grooves is larger than the tire circumferential pitch Ps of the shoulder lateral grooves and smaller than the tire circumferential pitch Pm of the middle inclined grooves.

2. The pneumatic tire according to claim 1, wherein an axial distance Dm between the axial inner end of the middle inclined groove and the crown main groove is in a range of from 1.5 to 5.0 mm.

3. The pneumatic tire according to claim 1 or 2, wherein the middle inclined groove has a straight groove portion which extends axially inward in a straight line at an angle β1 of not more than 15 degrees with respect to the tire circumferential direction, and
    a circumferential length Lm1 of the straight groove portion is not less than 50% of the circumferential length Lm of the middle inclined groove.

4. The pneumatic tire according to claim 3, wherein the straight groove portion has an axial inner groove edge extending in a straight form.

5. The pneumatic tire according to claim 1, wherein the angle β of each middle inclined groove is in a range of from 10 to 70 degrees with respect to the tire circumferential direction at intersections with the shoulder main groove.

6. The pneumatic tire according to claim 1, wherein each the crown lateral groove has a groove width of from 0.3 to 2.0 mm.

7. The pneumatic tire according to claim 1, wherein each middle rib is provided with a first middle sub groove and a second middle sub groove each of which extends axially inward from the shoulder main groove between circumferentially adjacent middle inclined grooves,
    axial inner ends of the first and second middle sub grooves are terminated within the middle ribs, and
    each circumferential length of the first and second middle sub grooves is not more than 30% of the circumferential length Lm of the middle inclined groove.

* * * * *